United States Patent
Cho

[19]

[11] Patent Number: 6,049,346
[45] Date of Patent: Apr. 11, 2000

[54] SECOND CASSETTE FEEDING APPARATUS FOR ELECTROSTATIC IMAGE-FORMING SYSTEM

[75] Inventor: Won-Mo Cho, Suwon, Rep. of Korea

[73] Assignee: SamSung Electronics Co., Ltd., Suwon, Rep. of Korea

[21] Appl. No.: 08/781,980

[22] Filed: Dec. 27, 1996

[30] Foreign Application Priority Data

Dec. 30, 1995 [KR] Rep. of Korea ............... 95/72285

[51] Int. Cl.⁷ ................ B41J 2/01; B65H 3/44; G03G 15/00
[52] U.S. Cl. ............... 347/153; 347/104; 271/9.11; 399/393
[58] Field of Search ............... 347/16, 4, 104, 347/105, 139, 153, 218; 399/16, 68, 21, 367, 393; 355/407; 358/296, 300, 498; 101/118, 419; 400/624, 605, 642, 584, 592, 607.2, 611, 613; 271/22, 127, 9.11, 9.06, 9.03, 9.01, 10.01

[56] References Cited

U.S. PATENT DOCUMENTS

| | | | |
|---|---|---|---|
| 3,884,458 | 5/1975 | Ryland | 271/9.02 |
| 4,577,850 | 3/1986 | Takeyama et al. | 271/22 |
| 4,966,356 | 10/1990 | Ohyabu et al. | 271/9.11 |
| 4,966,358 | 10/1990 | Yokoi et al. | 271/10.11 |
| 5,240,238 | 8/1993 | Lee | 271/9.11 |
| 5,294,106 | 3/1994 | Takagi et al. | 271/10.01 |
| 5,375,826 | 12/1994 | Flores | 271/10.01 |
| 5,435,537 | 7/1995 | Gyskling | 271/10.05 |
| 5,485,990 | 1/1996 | Kato | 271/9.08 |
| 5,819,153 | 10/1998 | Lim | 399/388 |

FOREIGN PATENT DOCUMENTS

| | | | |
|---|---|---|---|
| 58-36840 | 3/1983 | Japan | 271/9.11 |
| 3272726 | 11/1988 | Japan | 271/9.11 |
| 0455222 | 2/1992 | Japan | 271/9.11 |

Primary Examiner—N. Le
Assistant Examiner—L. Anderson
Attorney, Agent, or Firm—Robert E. Bushnell, Esq.

[57] ABSTRACT

There is disclosed a second cassette feeding apparatus for an electrostatic image-forming system employed to increase sheet feeding capacity, including a cassette frame for secondary paper feeding, formed on one side of a main body of the electrostatic image-forming system, and having a pickup roller for picking up a sheet of paper, and a driving roller forming a relay roller to convey the paper to a registration roller of the main body; and a second paper cassette inserted into the cassette frame to store sheets of paper, and having a passive roller forming the relay roller with the driving roller.

11 Claims, 4 Drawing Sheets

SECOND CASSETTE FEEDING APPARATUS FOR ELECTROSTATIC IMAGE-FORMING SYSTEM

BACKGROUND OF THE INVENTION

1. Field of the Invention

The present invention relates generally to an electrostatic image-forming system such as duplicating machines, laser beam printers and facsimile units using normal paper as print media. More particularly, it relates to a second cassette feeder for an electrostatic image-forming system which may be optionally attached to increase the sheet stacking capacity.

2. Description of the Related Art

In a conventional electrostatic image-forming system, if a user sends a command to print, a charger 42 uniformly charges an outer surface of a photoconductive drum 50 rotating at a predetermined velocity. A laser scanner unit generates a pixel laser beam corresponding to a time-serial electrical pixel signal of image data input from an original image photoelectrical reading unit (not illustrated), and then scans the surface of the photoconductive drum 50 with the laser beam through the mirror and an exposure window so that an electrostatic latent image corresponding to the image data is formed on the photoconductive drum 50.

The charged latent image areas attract and hold toner supplied by a developing unit 44 to be visualized as a toner image, and a paper pickup roller 45 picks up a sheet of paper 46 (print media) stacked in a paper cassette. The toner image that has been formed on the surface of the photoconductive drum 50 is transferred to the paper 46 by a transfer charger 48. At this point, the paper 46 adheres closely to the outer surface of the photoconductive drum 50 by electrostatic force, and the paper becomes separated from the surface of the photo-conductive drum 50 by a separator 49. The paper 46 is then conveyed between a heating roller 51 and a compression roller 52 of a fixing unit, and thereby the toner image is fixed in such a manner that an image-formed printer output can be achieved.

After toner image transfer, a cleaner 40 removes a residual toner on the surface of the photoconductive drum 50, and a pre-erase lamp array 43 eliminates the toner image remained on the surface of the photoconductive drum 50.

A paper cassette of the above-described image-forming system may have 150 to 200 sheet capacity, and a second cassette feeder (SCF) 55a with a special driving mechanism is optionally provided in a main body of the image-forming system in order to increase the capacity of the paper cassette. This SCF 55a is mounted under a main cassette feeder 55, and a paper pickup roller 45a that is used to pick up a sheet of paper 46a stacked in the SCF 55a cannot deliver the paper 46a to a registration roller 39 of the main body. Thus, the SCF 55a needs a relay roller 56 and a roller opening device (e.g. spring) used to separate the rollers from each other in case that there is a paper jam in the relay roller 56.

As mentioned above, it is difficult for the conventional SCF to deliver a sheet of paper to the registration roller by one rotation of the paper pickup roller, and the SCF should have the relay roller, which increases the size of the SCF. Besides, the SCF needs a special jam-removal mechanism to thereby make the image-forming system complicated.

SUMMARY OF THE INVENTION

Accordingly, the present invention is directed to a second cassette feeder for an electrostatic image-forming system which substantially obviates the above-described problems due to limitations and disadvantages of the related art.

It is an object of the present invention to provide an electrostatic image-forming system with a second cassette feeder which is of small size and may clear a paper jam easily.

In order to realize the above object, the present invention provides a second cassette feeding apparatus for an electrostatic image-forming system which is employed to increase sheet feeding capacity, including a cassette frame for secondary paper feeding which is formed on one side of a main body of the electrostatic image-forming system, and has a pickup roller for picking up a sheet of paper and a driving roller forming a relay roller to convey the paper to a registration roller of the main body; and a second paper cassette that is inserted into the cassette frame to store sheets of paper, and has a passive roller forming the relay roller with the driving roller.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same similar components, wherein.

DETAILED DESCRIPTION OF THE PREFERRED EMBODIMENT

Figure 1:
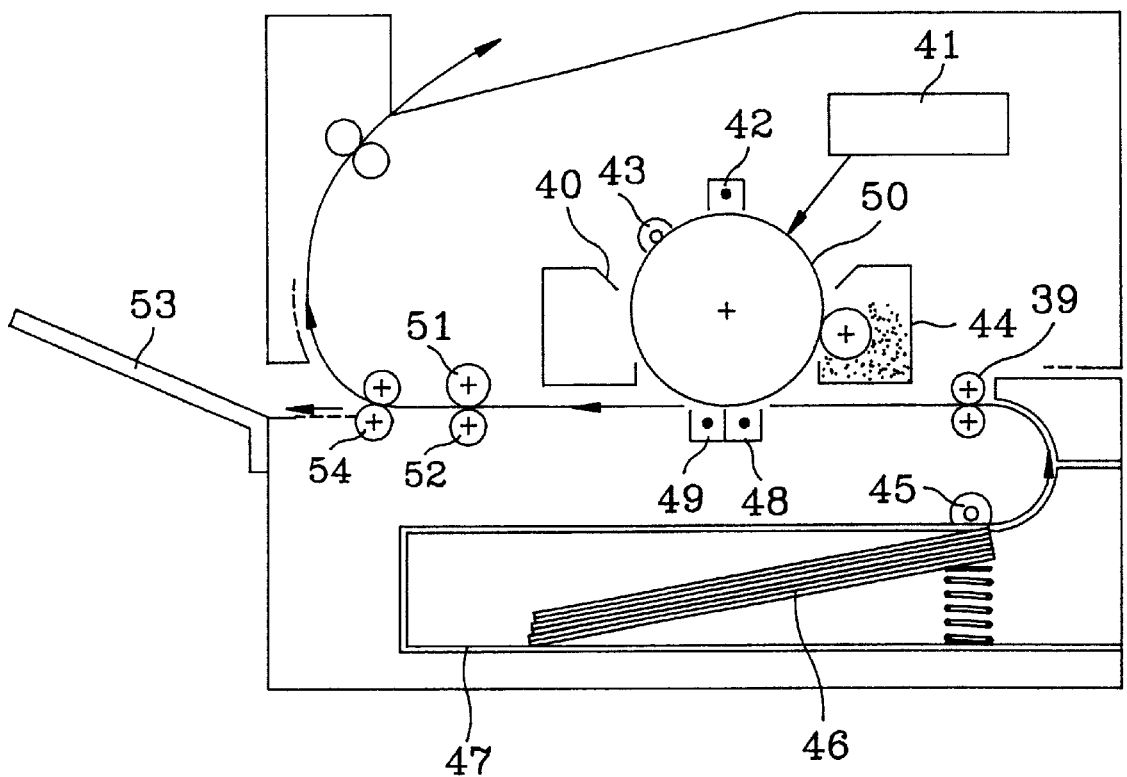
FIG. 1 depicts a schematic electrostatic image-forming system.
Figure 2:
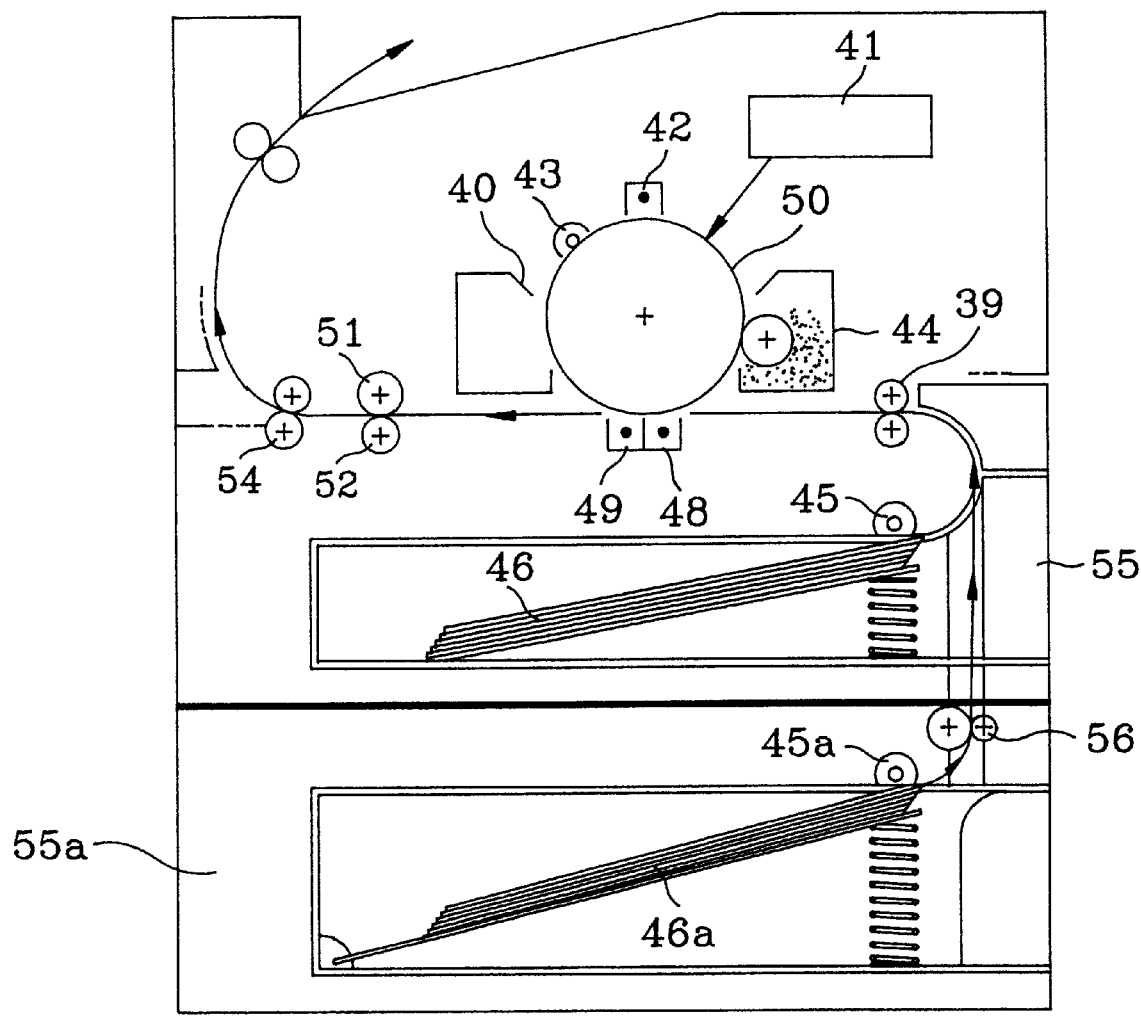
FIG. 2 is a schematic view of an electrostatic image-forming system equipped with a conventional second cassette feeder in accordance with the present invention.

Reference will now be made in detail to the preferred embodiment of the present invention, examples of which are illustrated in the accompanying drawings. Like reference numerals denote like parts throughout the specification and the drawings.

Figure 3:
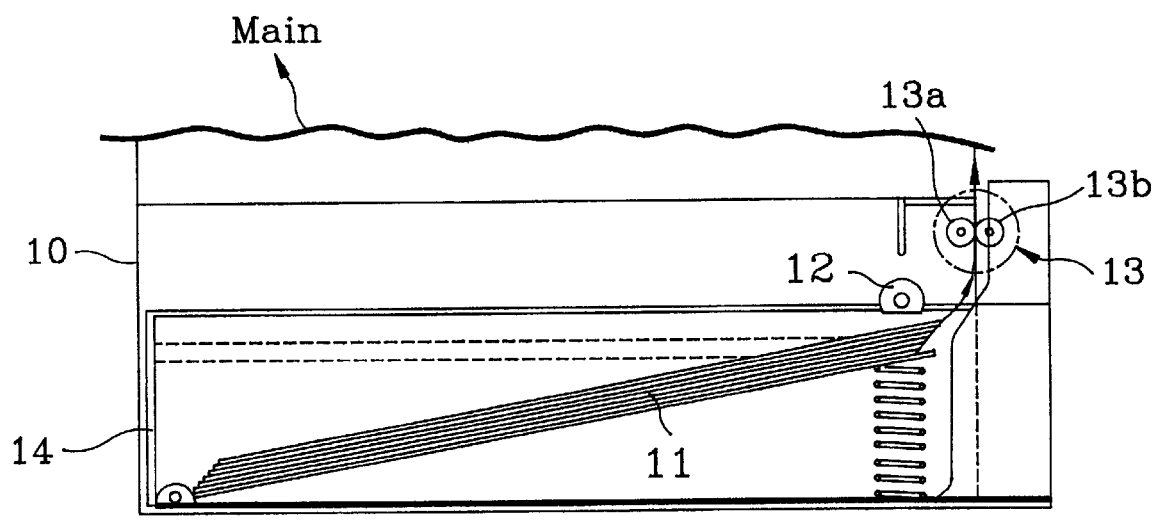
FIG. 3 is a sectional view of a second cassette feeder in accordance with the present invention.
Figure 4:
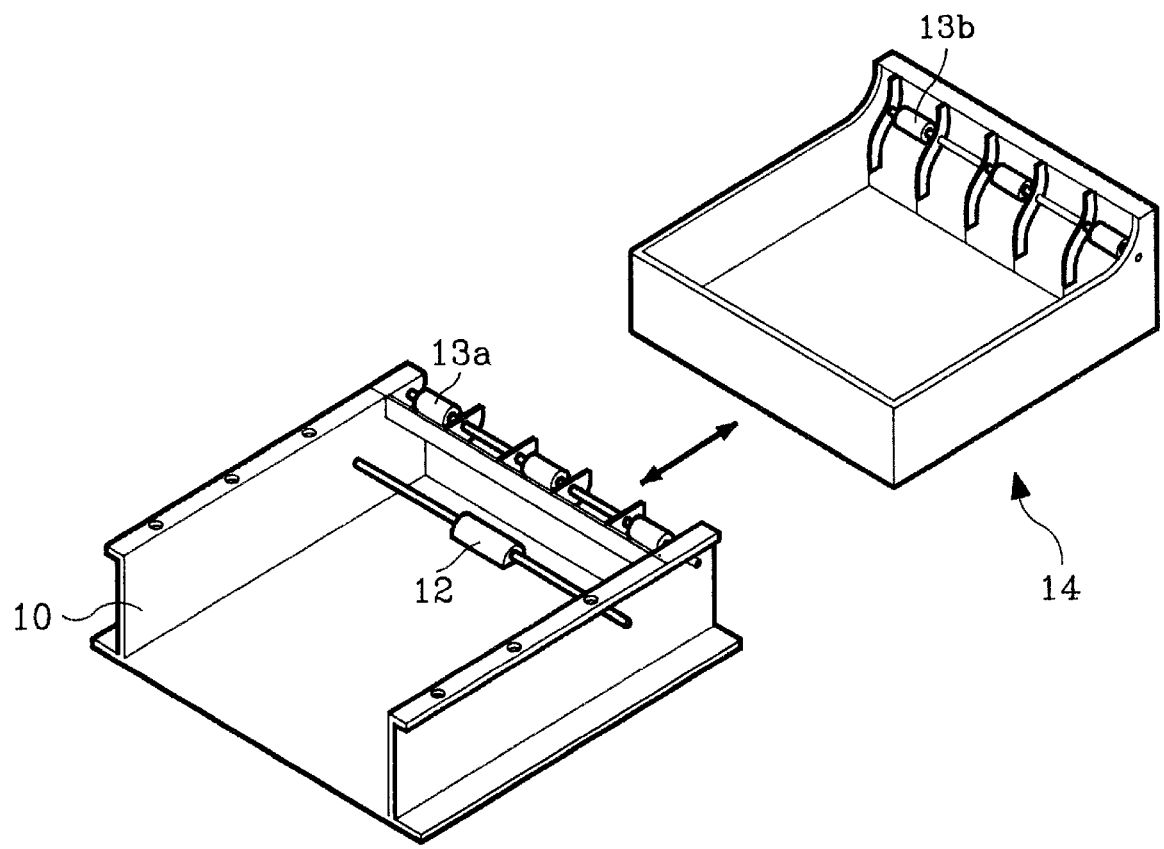
FIG. 4 is an exploded-perspective view of the second cassette feeder in accordance with the present invention.

Referring to FIGS. 3 and 4, a second cassette feeder for an electrostatic image-forming system in accordance with the present invention includes a cassette frame 10, a second paper cassette 14 for storing paper, a pickup roller 12 for picking up a sheet of paper 11, a relay roller 13 formed by a driving roller 13a and a passive roller 13b. The driving roller 13a is provided to the cassette frame 10 to convey the paper 11 to a registration roller 39 of a main body, and the passive roller 13b is formed in the second paper cassette 14.

The following description relates to the effect and advantage of the inventive SCF for an electrostatic image-forming system with reference to FIGS. 3 to 4.

Once the second paper cassette, also referred to as an inner housing in the claims, 14 containing the paper 11 is inserted into the cassette frame, also referred to as an outer housing in the claims, 10, the passive roller 13b of the second paper cassette 14 comes in contact with the driving roller 13a of the cassette frame 10 to form the relay roller 13. While the second paper cassette 14 is being completely inserted into the cassette frame 10, the pickup roller 12 is rotated in response to a paper feed signal to deliver the paper 11 to the relay roller 13. The paper 11 is inserted between the driving roller 13a and the passive roller 13b, and is conveyed to the registration roller 39 of the main body with the rotation of these rollers 13a and 13b. The subsequent process is similar to the conventional art described above.

Furthermore, by using a stackable supplemental paper tray that has both an inner housing and an outer housing it is easier to adjust the space required by the image forming system to accommodate a change in circumstances. By constructing the paper tray using two housings, the strength of the paper tray is increased to eliminate the necessity of constructing a large housing for the image forming system. Thus, when the amount of space available for the image forming system is reduced, the paper tray can be removed to eliminate the need for extra space. When multiple trays are used that are each inserted into the image forming system housing, the total size of the housing is fixed and increased. Additionally, a user can avoid using the supplemental paper tray entirely if there is no need for extra sheets of paper. The simplified design of the supplemental stackable paper tray allows for easy maintenance by users and simplified removal of the inner housing from the outer housing.

In case that there is a paper jam in the relay roller 13 of the SCF during operation, while the image-forming system stops operation, the driving roller 13a and the passive roller 13b may be separated from each other by taking the second paper cassette 14 out of the cassette frame 10 in order to allow a user to clear the paper jam.

According to the present invention, the passive roller and paper guide are integrally formed in the second paper cassette, and there is no need to have a special roller-separating mechanism. Thus, the second cassette feeder can be reduced in size and have more increased sheet capacity. In addition, the present invention has the relay roller whose driving and passive rollers can be separated from each other to thereby clear paper jams easily.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A supplemental stackable paper tray for an image-forming system, comprising:
    an outer housing attachable to said image forming system and capable of having said image forming system supported on a top side, said outer housing comprising:
        a frame;
        a pickup roller rotatably mounted to said frame for picking up a sheet of paper; and
        a driving roller rotatably mounted to said frame for conveying paper to said image forming system; and
    an inner housing insertable into said outer housing and comprising:
        a tray supporting a stack of paper;
        a passive roller rotatably mounted to said tray for acting cooperatively with said driving roller to convey said sheet of paper to said image forming system; and
        said inner housing slidably removable from said outer housing to separate said passive roller and said driving roller to remove a paper jam.

2. The supplemental stackable paper tray of claim 1, further comprised of said driving roller combining with said passive roller to form a relay roller to feed the sheet of paper to said image forming system.

3. The supplemental stackable paper tray of claim 1, further comprised of said driving roller and said passive roller contacting each other while said inner housing is completely inserted in said outer housing.

4. The supplemental stackable paper tray of claim 1, with said inner housing having a paper guide attached to said tray.

5. The supplemental stackable paper tray of claim 1, with said inner housing further comprising:
    a stand pivotally attached at one end to said tray for supporting said stack of paper; and
    an elastic member biasing said stand away from a base of said tray to bring a top sheet of paper from said stack of paper into contact with said pickup roller.

6. The supplemental stackable paper tray of claim 1, with said outer housing further comprising:
    a base; and
    two lateral sides attached edgewise and in a parallel fashion to each other, said two lateral sides and said pickup roller combining with said base to form a tunnel through into which said inner housing can be inserted.

7. A weight bearing supplemental paper tray, comprising:
    an outer housing having a base, being free from a front side or a rear side, and two lateral sides attached to said base, said two lateral sides capable of combining with an image forming system to form a tunnel, said outer housing comprising:
        a pickup roller attached to said two lateral sides; and
        a driving roller rotatably mounted to said frame for conveying paper to said image forming system; and
    an inner housing insertable in said tunnel and comprising:
        a tray containing a stack of paper;
        a passive roller rotatably mounted to said tray for acting cooperatively with said driving roller to convey said sheet of paper to said image forming system; and
        said inner housing being slidably removable from said outer housing to separate said passive roller and said driving roller to remove a paper jam.

8. The supplemental paper tray of claim 7, further comprised of said driving roller combining with said passive roller to form a relay roller to feed the sheet of paper to said image forming system.

9. The supplemental paper tray of claim 7, further comprised of said driving roller and said passive roller contacting each other while said inner housing is completely inserted in said outer housing.

10. The supplemental paper tray of claim 7, with said inner housing having a paper guide attached to said tray.

11. The supplemental paper tray of claim 7, with said inner housing further comprising:
    a stand pivotally attached at one end to said tray for supporting said stack of paper; and
    an elastic member biasing said stand away from a base of said tray to bring a top sheet of paper from said stack of paper into contact with said pickup roller.

* * * * *